Nov. 17, 1936. B. W. FREEMAN Re. 20,177

ORNAMENTING MACHINE

Original Filed Sept. 17, 1931 3 Sheets-Sheet 1

Inventor
Benjamin W. Freeman,

By Riordan & Riordan
Attorney

Nov. 17, 1936. B. W. FREEMAN Re. 20,177

ORNAMENTING MACHINE

Original Filed Sept. 17, 1931 3 Sheets-Sheet 2

Inventor
Benjamin W. Freeman
By Thordon & Thordon
Attorney

Nov. 17, 1936. B. W. FREEMAN Re. 20,177

ORNAMENTING MACHINE

Original Filed Sept. 17, 1931 3 Sheets-Sheet 3

Inventor
Benjamin W. Freeman,
By Riordan & Riordan
Attorney

Reissued Nov. 17, 1936

Re. 20,177

UNITED STATES PATENT OFFICE 20,177

ORNAMENTING MACHINE

Benjamin W. Freeman, Cincinnati, Ohio

Original No. 1,990,594, dated February 12, 1935, Serial No. 563,428, September 17, 1931. Application for reissue October 5, 1936, Serial No. 104,126

37 Claims. (Cl. 101—316)

This invention relates to shoe ornamenting machinery and more particularly to a type of machine illustrated in a co-pending application of even date herewith, Serial No. 563,427, now Patent No. 1,990,593, granted Feb. 12, 1935, adapted for operation upon skins, upper blanks, fitted or closed upper and the like.

Among the objects of the invention are the formation of ornamental designs in the work, by the application of a stamped or printed marking which may simulate stitching or may take the form of a design, by the production of ornamental cutouts in the work, or by combinations of both, and in marking and cutting simultaneously, or during a continuous cycle of operations.

Another object contemplates the application of markings to the work which may be used as a guide for subsequent operations, such as stitching, or aligning of the shoe parts with respect to the marked part.

Still another object resides in the provision of a marking device which will function as a stripper in addition to its marking functions. As a variation, a conventional stripper for the cutting die may be provided with marking edges or abutments suitably arranged thereon.

The machine illustrated herein utilizes a movable carriage or table upon which the work is mounted and power operated means for moving a combined cutting and marking die into and out of ornamenting relation to the work.

Means are provided for positioning work on the table and for holding the table and work positioning means in exact relation to the die during the cutting out operation so that the work will be properly located during such operation.

A further object of the present invention is to provide an inking means for the marking die, which instead of being power driven independently of the work table, as disclosed in the aforesaid co-pending application, is mounted upon or connected to the work table for movement therewith.

Another object is the provision of adjusting means whereby the amount of ink or pigment distributed on the edges of the marking die may be regulated so that any kind of a mark can be made, either, light, heavy or medium, and at the option of the operator the die may be inked to suit requirements or may be inked slow or fast as desired, for various materials, and the roll may be passed over the marker any number of times. Also as the ink may dry the operator can pass it over the die any number of times required, to replenish the ink.

It should be pointed out that this machine can be adapted to the use of other ornamenting materials than ink, examples being, pigment, gold leaf, silver leaf, etc. Use of the term "ink" as used herein and in the claims is intended to cover any such equivalent material.

Another object of the present invention resides in the improved safety mechanism including a control mechanism for a main clutch, which clutch is designed to connect the movable plunger of the machine to a suitable source of power.

In a prior application Serial No. 478,264, filed August 27th, 1930, now Patent No. 1,990,592, granted Feb. 12, 1935, there is shown a clutch operating mechanism similar to that hereinafter described, an object of the present invention, however, being to improve such mechanism in certain respects.

A still further object contemplates the provision of a machine in which the work may be supported by either a flat bed or by an anvil adapted to properly hold ring like work, such as closed and fitted uppers.

To the attainment of the foregoing and other objects which will appear as the description proceeds, reference may be made to the accompanying drawings, in which Fig. 1 is a side elevation of the machine;

Figure 1:
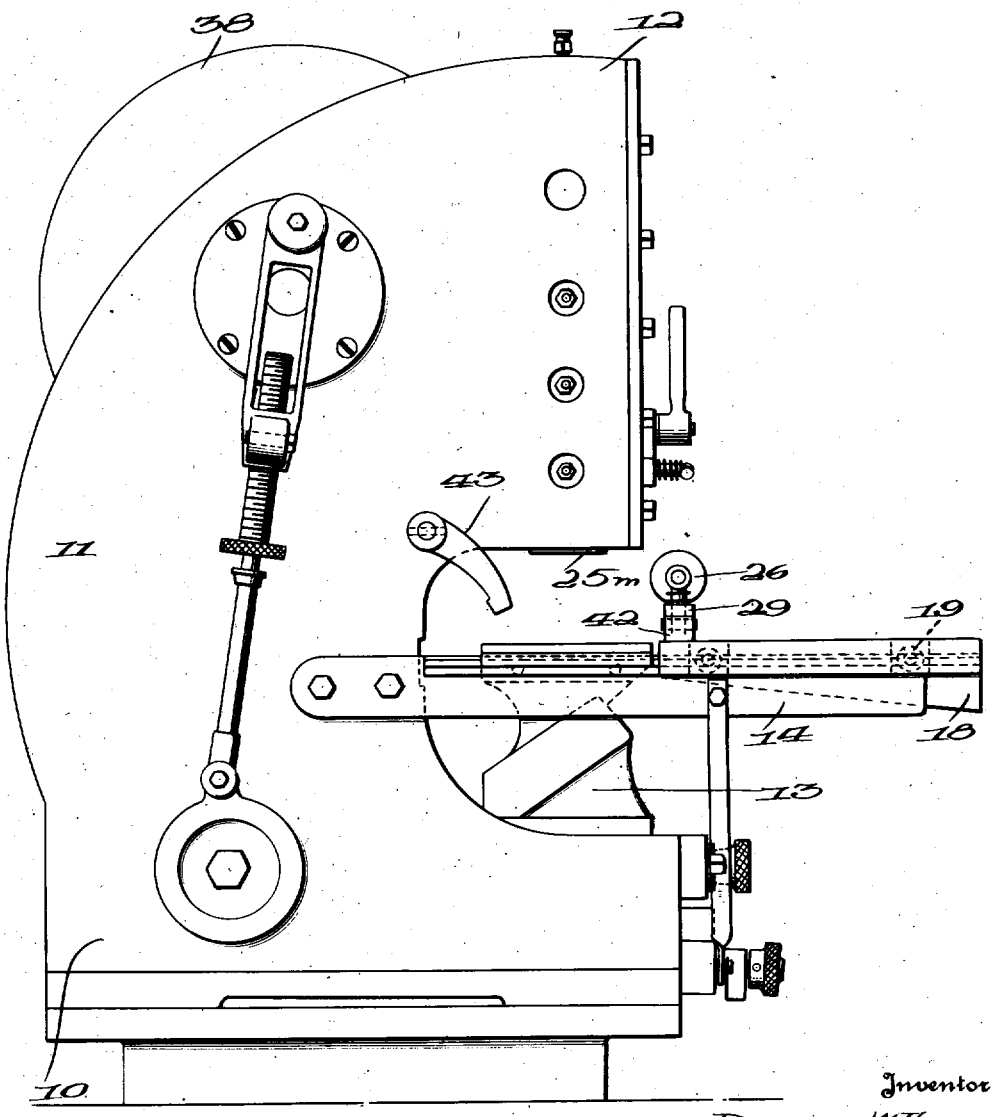

The present machine is adapted to use a die for cutting directly from a skin, or a die for ornamenting, cutting, or perforating an upper blank which has been previously cut from the skin, regardless of whether such blank is flat or shaped into a closed upper. It comprises generally a power driven plunger cooperating with the die, (in the illustrated embodiment the die is mounted on the plunger for movement therewith, although such die might readily be mounted independently of the plunger) and an anvil or work support upon which the work is positioned, this work support being movable into and out of operating position with respect to the die, there being preferably a backing member of paper or its equivalent between the work and the support. Means are provided for properly aligning, gauging and positioning the work.

Referring more specifically to the drawings, in which like reference numerals designate like parts, it will be observed that the machine comprises generally a base 10 having an upwardly extending frame or casing 11 which terminates in a head portion 12, such head portion overhanging the front part of the base to provide an enclosure within which is mounted an anvil 13. Secured to the frame and extending adjacent the anvil 13 is a pair of guides 14—15 of which 14 is provided with a V-shaped upper surface 16, and 15 with a T-shaped surface 17. Mounted for sliding movement on the guides is a work table or carriage 18 which is provided with a pair of rolls 19 shaped to conform to the surface 16 and a pair of flat surfaced rollers 20 for cooperation with the surface 17.

The table 18 carries a work positioning plate 21 which is located and held in position by a series of pins 18' extending into suitable openings of the plate. The plate 21 is provided with a work locating abutment 22, work rotating clips 23, and openings 24 over which the work is laid, the openings permitting passage of the cutting dies through the work and into engagement with a backing plate or paper thus insuring a clean cut. For a more complete description of this structure and the operation thereof reference may be made to the co-pending application filed of even date herewith.

Enclosed within the head 12 is a plunger 31 carrying a combined marking and cutting die and adapted for reciprocating movement into and out of ornamenting relation to the work. The specific details of this mechanism form no part of the present invention, being fully disclosed and claimed in the aforesaid co-pending case.

Figure 6:
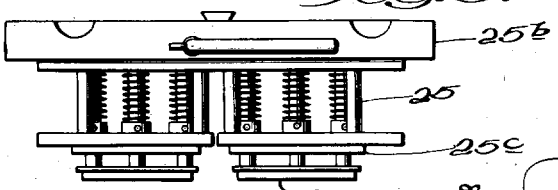
Fig. 6 is a front elevation of the die unit.

However, as illustrated in Fig. 6 it will be observed that the die 25 comprises generally a supporting block **25*b* carrying a resiliently mounted cutting die 25*c* and a resiliently supported marking die 25*m*, the marking edges of which are spaced normally in advance of the cutting edges 25*c***.

Resiliently mounted adjacent the rear or inner edge of the carriage 17 is an inking roll 26 supported by bearings 27, which are mounted upon studs 28 in brackets 29 extending upwardly from the table 18. Springs 30 serve to hold the roll 26 normally in upwardly spaced relation to the table and at such a height as to cause the roll, upon movement of the table, to engage the marking edges 25. It will be evident then that as the operator pulls the table outwardly for placement of work thereon, that the roll 26 will ink the edges 25 which inking will be repeated as the table is pushed inwardly to bring the work under the die.

Figure 2:
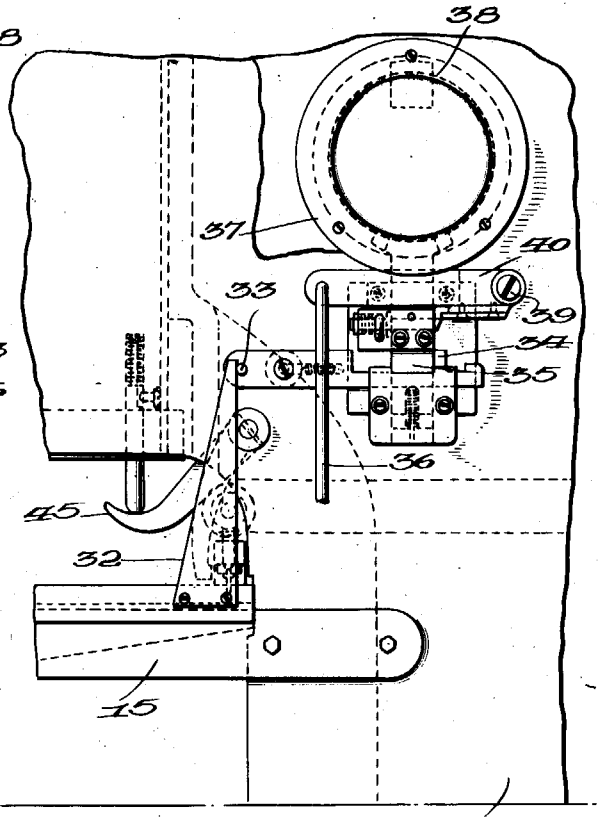
Fig. 2 is a fragmentary side elevation of the machine taken from the side opposite to that of Fig. 1.

Attached to and extending upward from the work table is a plate or finger 32 adapted to engage a clutch lock 33, and as the table moves inwardly this member will be likewise moved towards the rear of the machine into the position shown in Fig. 2, causing a lug 34, forming part of the lock 33, to move out of the path of movement of the clutch key 35 so that the plunger 31 may be operated. Actuation of the plunger is effected by depressing a treadle rod 36, which controls the single revolution clutch indicated generally at 37, whereby to connect a continuously driven pulley 38 (furnishing the main source of power to the machine) to a main shaft (not shown) and by means of which the plunger 31 is actuated. This clutch includes a stud 39 about which the clutch lever 40 operates.

From the foregoing description the general operation of the machine will be readily apparent; the work table is pulled out and the operator inserts a piece of work on the work positioning plate 21, and in drawing the table outwardly the forward portion of the ink roller contacts with the marking die giving it its initial inking and there is a second inking when it moves back. The amount of ink distributed on the marking edges can be regulated by the operator through the medium of adjusting nuts 41 so that any kind of a mark can be made, either, light, heavy or medium, and the die may be inked to suit requirements or may be inked slow or fast for various materials, as desired, and as the ink may dry the operator can pass the roll over the die any number of times to replenish the ink.

It will be evident that, as the springs supporting the ink roller 26 are relatively light when compared with the springs supporting the marking element in the die unit, and the adjusting nuts 41 permit a control of the springs supporting the marking element, there will be no retrograde movement of the marking element or stripper when ink is applied, and as the marking element is spaced in advance of the cutting edges, no ink will be applied to the cutting edges.

It is essential, that the work and work table, after it is moved inwardly to position beneath the plunger be accurately located and held in position during the ornamenting operation. To this end there is provided an abutment 42 which engages a lever 43 mounted on a shaft 44 extending transversely of the machine. A second lever 45 is mounted on the opposite end of the shaft 44 and is formed with an offset end extending beneath a pin 46 resiliently mounted in the plunger 31. A spring 47 serves to normally hold the levers 43 and 45 in an upward position, out of engagement with the work table or abutment 42. As the plunger descends the pin 46 will engage the lever 45 and thereby lock the shaft 44 bringing lever 43 into engagement with the abutment 42 to hold the table in its inward position. The resilient mounting of the pin 46 permits a further downward movement of the plunger to complete the ornamenting of the work.

The upward movement of the plunger completes a cycle of operations and the table may be again drawn outwardly for the insertion of a new piece of work.

On upward movement of the plunger which acts to draw the dies from the work, the cutting die will first be withdrawn from the work, the springs of the resilient mounting serving to hold the marking plate against the work. The marking plate thus will function as a stripper for the cutting dies in addition to its primary function of placing a marking on the work.

An advantage in the die structure, above described, and wherein the marker is resiliently mounted, resides in the fact that need for adjustment of the marker is eliminated, inasmuch as need for pressure in marking is eliminated, this being due to the fact that no indentation as such is necessarily made in the work. Too much pressure on the marker, which also functions as a stripper, will cut leathers. In known types of indenting markers, a spring tension sufficient to place an impression in the work is required, and conventionally the stripper or marker of such type is usually provided with a rubber backing effective to distribute the pressure evenly. It is impossible to handle various thicknesses of leather, under such conditions, because if such a stripper is adjusted to indent a thick piece of leather, then insufficient pressure would be had to indent a thin piece. On the other hand, if the marker is adjusted to impress a thin piece of leather, then the pressure will be so great as to cut rather than merely indent greater thicknesses. In a similar manner, various types of leather or material used require different adjustments of the stripper, and in a good many instances regardless of adjustments, indentation cannot be satisfactorily accomplished. The net result, and use of such prior art devices is that different dies must be used for different thicknesses or types of material, or some adjustment must be made.

With the present invention the situation is entirely different. A conventional stripper mounting, using springs effective for one type and thickness of material is adapted to variant thicknesses, and the relation between the marker (or stripper) mounting and cutter, as disclosed herein, is adapted to various types and thicknesses of leather, because with the inked marking, in combination with cutting, no indentation as such is necessary, and hence a spring tension sufficient merely to strip is all that is required, no real pressure being needed in the application of ink, as distinguished from an impression or indenting marker.

The positioning or work supporting plate 21, as illustrated is made to support flat work and the embodiment of machine herein is designed especially to perform an ink marking and cutout operation on flat work. However, the support 13 is in the form of an anvil and obviously by use of a different style of work table 18 and plate 21 could be readily adapted to cut out and mark fitted work. As an example, a work support of the general shape illustrated in the above mentioned co-pending applications might readily be substituted for the one illustrated herein, and it is contemplated that this machine may use a work support having top surfaces of any desired size, area and shape necessary to accommodate same to a particular blank whether flat work or of the fitted upper type.

Figure 3:
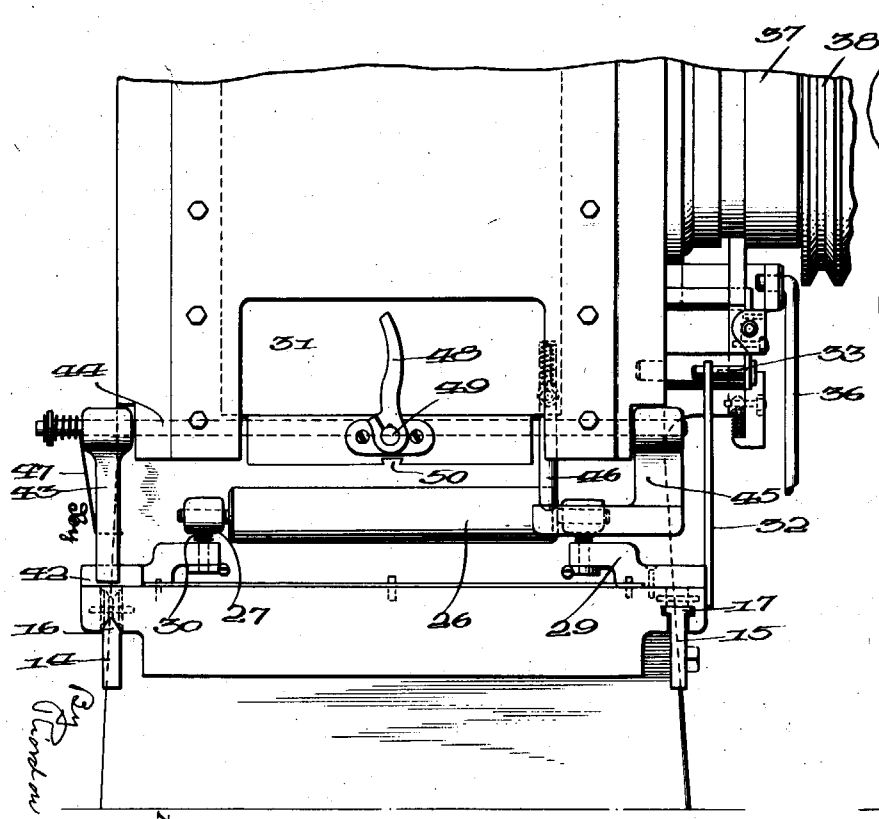
Fig. 3 is a fragmentary front elevation of the machine.
Figure 4:
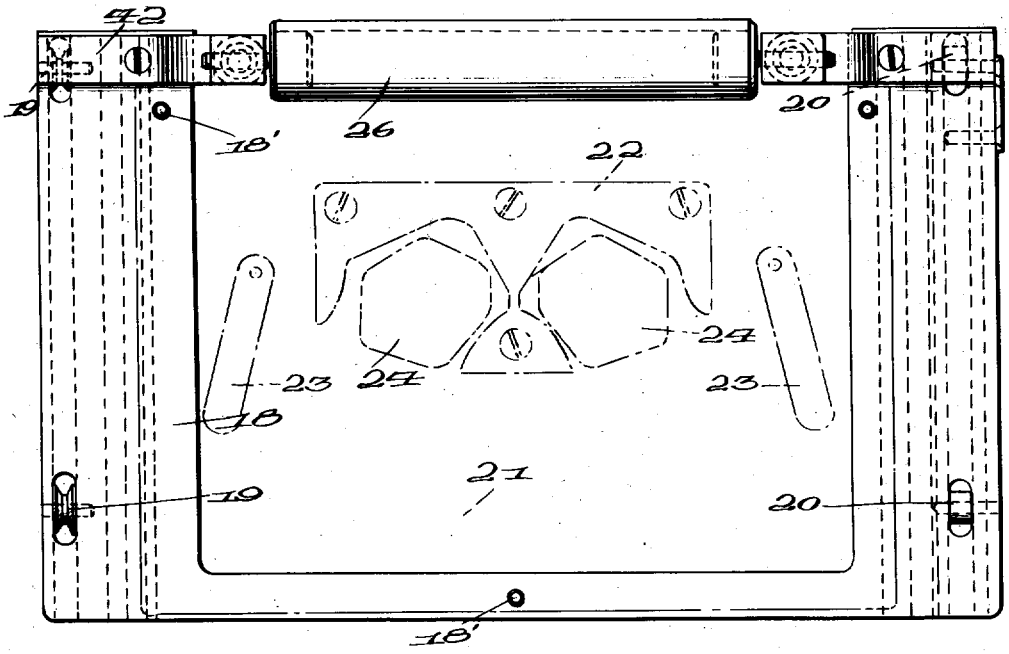
Fig. 4 is a plan view of the work table illustrating the inking roll.
Figure 5:
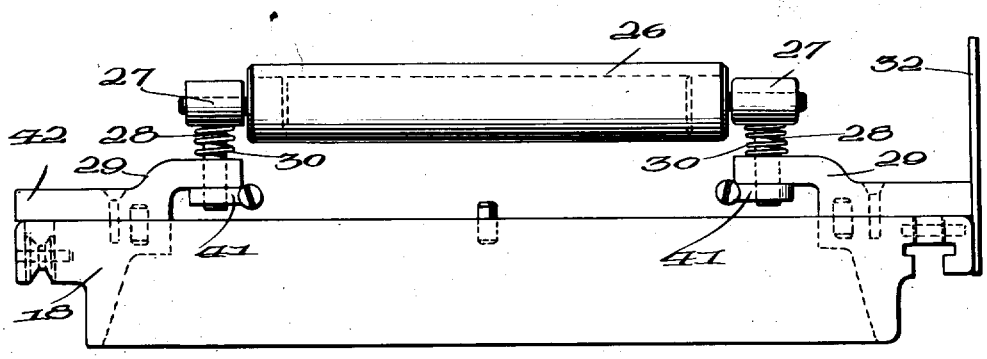
Fig. 5 is a front elevation of the work table of Fig. 4.

The handle 48 illustrated in Fig. 3 is mounted on a cam shaft 49 above the dovetail groove 50, the purpose of this mechanism being to demountably attach a suitably combined marking and cutting die.

It is contemplated that movements of the table may be effected manually as shown in my prior Patent No. 1,681,033, dated August 14th, 1928, or may be effected by the application of power suitably applied as illustrated in a prior patent, Reissue No. 18,162, of August 25th, 1931.

Having thus described my invention, what I claim as new and desire to secure by Letters Patent of the United States, is:—

1. A machine for ornamenting shoe parts comprising a movable support, means to properly position a piece of work on said support, a marking die and a cutting die, means mounted on said support to apply ink to said marking die, means to actuate said marking and cutting dies as a unit into ornamenting relation to the work, and means to restrain said actuating means until said support reaches a predetermined position relative to said dies.

2. A machine for ornamenting shoe parts comprising a movable work plate, means to properly position a piece of work on said plate, a marking die and a cutting die, means to apply ink to said marking die, means to move said dies into ornamenting relation to the work piece, means to restrain said die moving means against actuation, and means on said plate cooperative with said restraining means to release said die moving means when said plate reaches a predetermined position.

3. A machine for ornamenting shoe parts comprising a movable support, means to properly position a piece of work on said support, a marking die and a cutting die, a roll resiliently mounted on said support and effective to apply ink to said marking die, means to actuate said dies toward the work, and means positioned in the path of movement of said support, effective to restrain said die actuating means against actuation until said support reaches a predetermined position.

4. A machine for ornamenting shoe parts comprising a movable support, means to properly position a piece of work on said support, a marking die and a cutting die, means on said support to apply ink to said marking die, means mounting said inking means for adjustment, whereby the amount of ink distributed on said die may be regulated, means to actuate said dies toward the work, and means positioned in the path of movement of said support, effective to restrain said die actuating means against actuation until said support reaches a predetermined position.

5. A machine for ornamenting shoe parts comprising a fixed support, a movable support having an opening therethrough, means to properly position a piece of work on said movable support over said opening, means to move said movable support to a location where said opening is adjacent a surface of said fixed support, a marking die and a cutting die, means mounted on and movable with said movable support to apply ink to said marking die, and pressure applying means for said cutting and marking dies effective to move the dies into ornamenting relation to the work.

6. A machine for ornamenting shoe parts comprising a movable support, means to properly position a piece of work on said support, a marking die and a cutting die, means movable with said support to apply ink to said marking die, means to initiate movement of said dies toward the work, and means controlled by said support to hold said dies in an inoperative position until the support reaches a predetermined position relative to said dies.

7. A machine for ornamenting shoe parts comprising a movable support, means to properly position a piece of work on said support, a cutting die having a marking plate operatively mounted thereon, means on said support to apply ink to said marking plate when the support is in one position relative to the dies and when the marking plate is in one position relative to the cutting die, means to move said cutting die and said plate into engagement with the work whereby the work will receive an ink impression and will be perforated, means to restrain said plate and die from movement toward the work until the support is in a predetermined position relative thereto, and means to hold said support in such predetermined position until the plate and die have effected their ornamenting operation.

8. An ornamenting machine comprising a movable work support, a combined marking and cutting die unit, pressure applying means for moving said die unit into ornamenting relation with a work piece on said support, means to automatically apply ink to said unit during movements of the support, means to accurately position and hold said support relative to said die unit, and means to actuate said pressure applying means thereby to ornament the work.

9. In a machine for ornamenting shoe parts, having a combined marking and cutting die unit, a work table, a removable plate thereon for positioning and supporting the work, an ink applying means on said table above said plate, and means supporting said table for movement into and out of operative position relative to said die unit whereby ink may be applied to said unit, and the work may be positioned therebeneath.

10. A machine for ornamenting shoe parts comprising a movable support, means to properly position a piece of work on said support, a marking die and a cutting die, means mounted on said support to apply ink to said marking die, means to move the die toward the work, means releasable by said support to lock said die moving means, and means to lock the support in a predetermined position relative to said dies.

11. A machine for ornamenting shoe parts comprising a work support, means to properly position a piece of work on said support, a marking die and a cutting die, movable means to apply ink to said marking die, means to move said support, means to move the dies toward the work, means releasable by said support to lock said die moving means, and means to lock the support in a predetermined position relative to said dies.

12. A machine for ornamenting shoe parts comprising a movable support, means to properly position a piece of work on said support, a marking die and a cutting die, a roll resiliently mounted on said support and effective to apply ink to said marking die, means to move the dies toward the work, means releasable by said support to lock said die moving means, and means to lock the support in a predetermined position relative to said dies.

13. A machine for ornamenting shoe parts comprising a movable support, means to properly position a piece of work on said support, a marking die and a cutting die, means on said support to apply ink to said marking die, means mounting said inking means for adjustment, whereby the amount of ink distributed on said die may be regulated, means to move the dies toward the work, means releasable by said support to lock said die moving means, and means to lock the support in a predetermined position relative to said dies.

14. An ornamenting machine comprising a movable work support, a combined marking and cutting die unit, pressure applying means for moving said die unit into operating relation with a work piece on said support, means on said support to gauge the position of the work relative to said die unit, means to actuate said pressure applying means thereby to ornament the work, means to restrain said pressure controlling means from operation until the work is accurately positioned with respect to said die unit, and means to restrain said support from movement, when the work is so positioned, until the die unit has effected its ornamenting operation.

15. An ornamenting machine comprising a combined marking and cutting die unit movable means to accurately position a work piece relative to said die unit, pressure applying means for moving said die unit into operative relation with the work piece, means to actuate said pressure applying means thereby to ornament the work, and means to control movement of said pressure applying means, including a member movable with said work positioning means.

16. An ornamenting machine comprising a combined marking and cutting die unit, pressure applying means for moving said die unit into operative relation with a piece of work in said machine, movable gauge means effective to accurately position said work relative to said die unit, means to actuate said pressure applying means thereby to ornament the work, and means to control movement of said pressure applying means, including a member movable with said work positioning means.

17. An ornamenting machine comprising a movable work support, a combined marking and cutting die unit, pressure applying means for moving said die unit into operating relation with a work piece on said support, means to accurately position said work support relative to said die unit, means to actuate said pressure applying means thereby to ornament the work, means to restrain said pressure applying means from actuation until the work support is accurately positioned relative to the die unit, and means to hold the work support when in its predetermined position until the die has effected its ornamenting operation.

18. A machine for ornamenting shoe parts comprising a fixed support, a movable support having an opening therethrough, means to properly position a piece of work on said movable support over said opening, means to move said movable support to a location where said opening is adjacent a surface of said fixed support, a marking die and a cutting die, means mounted on and movable with said movable support to apply ink to said marking die, pressure applying means for said cutting and marking dies effective to move the dies into ornamenting relation to the work, and a backing member interposed between the surface of said fixed support and said opening.

19. A machine for ornamenting shoe parts comprising a movable support having an opening therethrough, means to properly position a piece of work on said support over said opening, a head, means for holding a marking die in said head, means for holding a perforating die in said head, means movable with said support to apply ink to said marking die, means to bring said dies and work into operative engagement thereby to ornament the work, and a backing member extending across said opening.

20. A machine for ornamenting shoe parts comprising a movable support having an opening therethrough, means to properly position a piece of work on said support over said opening, a marking die and a cutting die, means movable with said support to apply ink to said marking die, means to initiate movement of said dies toward the work, means controlled by said support to hold said dies in an inoperative position until the support reaches a predetermined position relative to said dies, and a backing member extending across said opening.

21. An ornamenting machine comprising a movable work support, a combined marking and cutting die unit, pressure applying means for moving said die unit into ornamenting relation with the work piece on said support, means to accurately position said work support relative to said die unit and to lock said table in position, means to actuate said pressure applying means thereby to ornament the work, and means to restrain said pressure applying means from actuation until said table is accurately positioned.

22. An ornamenting machine comprising a movable work support, a combined marking and cutting die unit, pressure applying means for moving said die unit into ornamenting relation with a work piece on said support, means to lock said table in operating position relative to said die, means to actuate said pressure applying means thereby to ornament the work, and means to restrain said pressure applying means from actuation until said table is accurately positioned.

23. An ornamenting machine comprising a frame, a movable work support, a die, pressure applying means for moving said die into ornamenting relation with a work piece on said support, means to accurately position said work support relative to said die, including an abutment on said support, a lever on said frame engageable with said abutment, and a member movable with said pressure applying means to operatively engage said lever and position same against the abutment, and means to actuate said pressure applying means thereby to ornament the work.

24. An ornamenting machine comprising a frame, a movable work support, a die, pressure applying means for moving said die into ornamenting relation with a work piece on said support, means to accurately position said work support, relative to said die, including an abutment on said support, a lever on said frame engageable with said abutment, and a resiliently mounted member movable with said pressure applying means to operatively engage said lever and position same against the abutment, means to normally hold said lever out of engagement with the abutment, and means to actuate said pressure applying means thereby to operate said lever and to ornament the work.

25. An ornamenting machine comprising a work support, a combined marking and cutting die unit, pressure applying means for moving said die unit into ornamenting relation with a work piece between said support and unit, means movable into and out of operative relation to said die unit, and engageable with the work piece, whereby said work piece may be accurately positioned relative to the die unit, and means to actuate said positioning means and said pressure applying means in a predetermined synchronized relation.

26. A machine for ornamenting shoe parts comprising a movable support, means to properly position a piece of work on said support, a marking die and a cutting die, means mounted on said support to apply ink to said marking die, means to effect a relative movement of the said support, and said marking and cutting dies as a unit into ornamenting relation to the work, and means to restrain said actuating means until said support reaches a predetermined position relative to said dies.

27. A machine for ornamenting shoe parts comprising a movable work support, means to properly position the piece of work on said support, a marking element and a cutting die, means movable with said support to apply ink to said marking element, means to produce a relative movement between said marking element and said cutting die with respect to the work support, and means controlled by said support to prevent such relative movement until the support reaches a predetermined position relative to said dies.

28. An ornamenting machine comprising a combined marking and cutting die unit, movable means to accurately position a work piece relative to said die unit, pressure applying means for effecting a relative, operative movement between said die unit and the work piece, means to actuate said pressure applying means thereby to ornament the work, and means to control movement of said pressure applying means, including a member movable with said work positioning means.

29. An ornamenting machine comprising a combined marking and cutting die unit, pressure applying means for effecting a relative, operative movement between a piece of work in said machine and said die unit, movable gauge means effective to accurately position said work relative to said die unit, means to actuate said pressure applying means thereby to ornament the work, and means to control movement of said pressure applying means, including a member movable with said work positioning means.

30. A machine for ornamenting shoe parts comprising a movable work support having an inner locked position and an outer work mounting position, means to properly position the piece of work on said support, a cutting die having a marking plate properly mounted thereon, means in said machine to apply ink to said marking plate when the support is in one position relative to the die and the marking plate is in one position relative to the cutting die, means to produce a relative movement between said cutting die and marking plate with respect to the work whereby the work will receive an ink impression and will be perforated, means to prevent such relative movement until the work support is in a predetermined position relative to said marking plate and die, and in its locked position.

31. An ornamenting machine comprising a movable work support, a combined marking and cutting die unit the marking die being resiliently mounted to project beyond the cutting edges of the cutting die, pressure applying means for effecting relative movement between said die unit and said support, a removable plate located in predetermined position on said support and having gauging means thereon for accurately locating the work, means to actuate the pressure applying means thereby to apply the marking die and cutting die progressively to the work piece to ornament the same, means to restrain said pressure applying means from said actuation until the work support has been moved to a locked position to accurately locate the work with reference to the die, including a member movable with said support, an inking roll carried by said work support to ink the marking die upon movement of said support.

32. A machine for ornamenting shoe parts comprising a movable work support, means to properly position the piece of work on said support, a marking die, having a marking surface, a cutting die having a cutting element, means to apply ink to the marking element of said marking die comprising a member mounted for movement through the plane of the marking surface on said marking die, means to provide a relative movement between said marking die and cutting die and work whereby said dies operate upon the work.

33. A machine for ornamenting shoe parts comprising a movable work support, means to properly position the piece of work on said support, a marking die, having a marking surface, a cutting die having a cutting element, means to apply ink to the marking surface of said marking die comprising a member mounted for movement through the plane of the marking element on said marking die, means to provide a relative movement between said marking and cutting die, and means to restrain said movement providing means until said work support reaches a predetermined position relative to said die.

34. A machine for ornamenting shoe parts comprising a movable work support having an inner locked position and an outer work mounting position, means to properly position the piece of work on said support, a combined marking and cutting die unit, pressure applying means for producing relative movement between said unit and a work piece on the work support, means on said support to gauge position of the work relative to said die unit, means to actuate said pressure applying means thereby to ornament the work, means to restrain said pressure applying means from operation until the work is accurately positioned with respect to the die unit, and said support in locked position.

35. A machine for ornamenting shoe parts comprising a movable work support, means to properly position the piece of work on said support, marking and cutting die unit, pressure applying means for producing relative movement between said unit and a work piece on said support, means on said support to gauge position of the work relative to said die unit, means in said machine to apply ink to said unit, means mounting said movable work support for separation from said unit during application of ink to said unit and for operative association with said unit after said ink application has been effected, means to actuate that pressure applying means thereby to ornament the work and means to restrain such pressure applying means from operation until the work is in accurate position with respect to said die unit and while ink is being applied to said unit.

36. In a machine for ornamenting shoe parts, having a combined marking and cutting die unit, a work table, a removable plate thereon for positioning and supporting the work, an ink applying means on said table resiliently mounted to project from said plate, and means supporting said table for movement into and out of operative position relative to said die unit whereby ink may be applied to said unit, and the work may be positioned with relation thereto.

37. An ornamenting machine comprising a movable work support, a combined marking and cutting die unit, pressure applying means for effecting relative movement between said die unit and a work piece on said support, whereby to ornament the work piece, means to lock said table in operating position relative to said die, means to actuate said pressure applying means thereby to ornament the work, and means to restrain said pressure applying means from actuation until said table is accurately positioned.

BENJAMIN W. FREEMAN.